June 2, 1931.  A. A. THOMAS  1,807,640
AUTOMOBILE BUMPER
Filed June 17, 1930
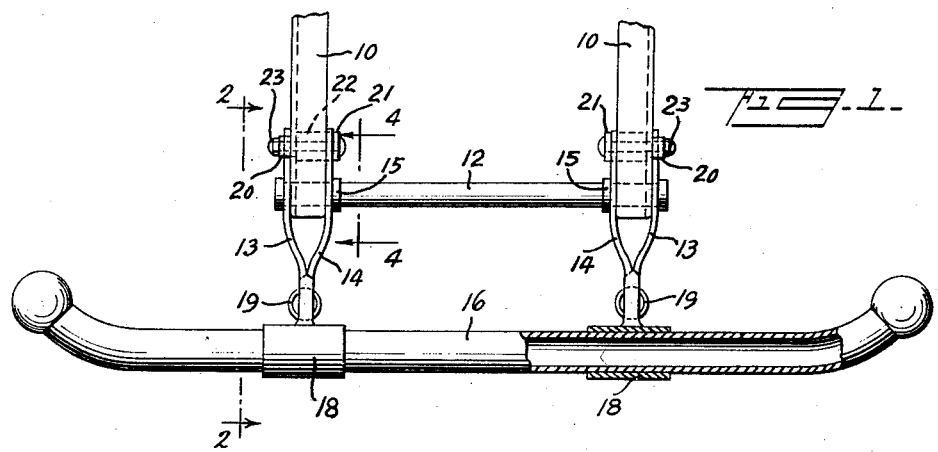
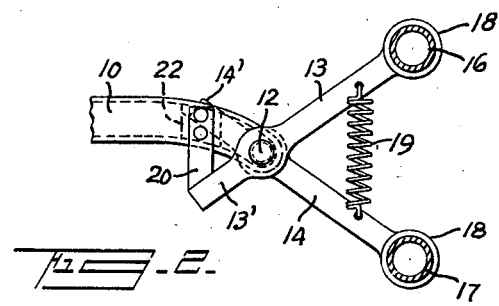
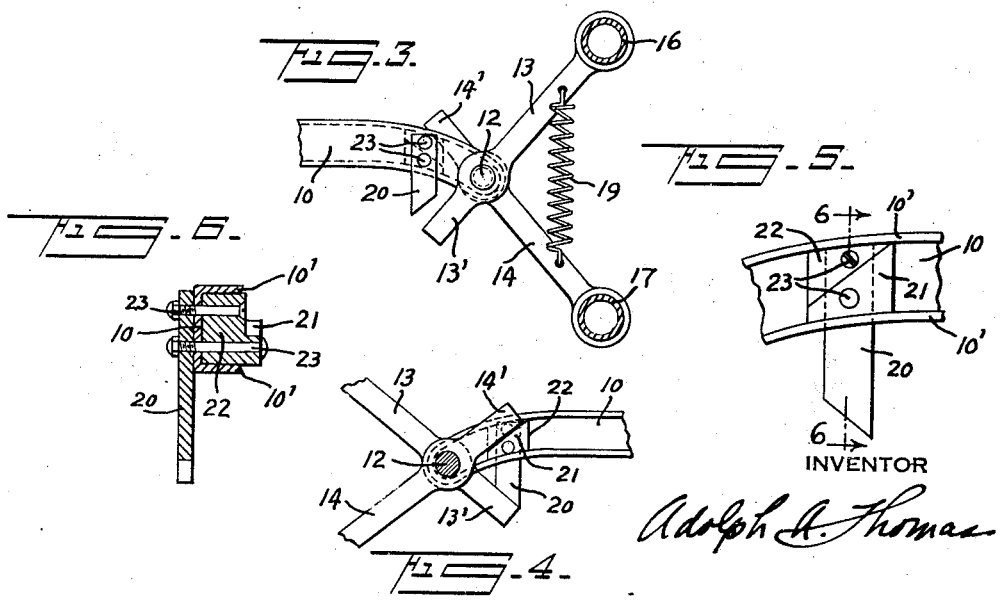
INVENTOR
Adolph A. Thomas Patented June 2, 1931

1,807,640

UNITED STATES PATENT OFFICE

ADOLPH A. THOMAS, OF NEW YORK, N. Y.

AUTOMOBILE BUMPER

Application filed June 17, 1930. Serial No. 461,687.

My invention is for automobile bumpers adapted to absorb the shock of a collision by translating it in a vertical direction. For this purpose I employ a pair of bumper bars carried by two pairs of pivoted links which are arranged vertically in scissors fashion. A contracting coil spring or other elastic member connects each pair of links near their outer ends, and stops normally hold the links of each pair a certain distance apart. When the bumper bars strike an obstruction, the links are forced apart and expand the springs, which thereby take up the shock in a vertical direction. In other words, the force that strikes the car in the direction of its longitudinal axis spends itself in a vertical direction, so that the car and its occupants are relieved of a sudden jolt and its attendant dangers.

The novel features and practical advantages of my invention will be understood from a description of the accompanying drawings, in which—

Fig. 1 shows a plan view of my new bumper attached to the front end of an automobile, certain parts being sectioned for clearness;

Fig. 2 is a side view on line 2—2 of Fig. 1, with the parts in normal position;

Fig. 3 is similar to Fig. 2, but showing the position of the movable parts under the force of an impact;

Fig. 4 represents a cross-section on line 4—4 of Fig. 1;

Fig. 5 is an enlarged side view of the stops for the links; and

Fig. 6 shows a section on line 6—6 of Fig. 5.

The chassis extensions 10 of an automobile are connected by a cross-bar 12 on which two pairs of links 13—14 are pivoted. The upper links 13 are arranged outside the extensions 10 and the lower links 14 are on the other side of the extensions. Collars or other stops 15 on rod 12 prevent side movement of the lower links 14. The lateral spacing of the links at their pivot points increases the stability of the bumper structure as a whole.

A bumper bar 16 is carried by the upper links 13 and a similar bar 17 is mounted on the lower links 14. The bumper bars 16 and 17 are preferably cylindrical and extend through sleeves or bushings 18 attached to the outer ends of links 13 and 14. Any other practical means may be used for rigidly connecting the bumper bars to the links. The links 13 and 14 of each pair are connected near their outer ends by a contracting coil spring 19. As shown in Fig. 1, the links are curved toward each other, so that the connecting points of the links are substantially in vertical alignment, although this is not absolutely necessary.

The links 13—14 are provided with rear extensions 13' and 14' respectively, arranged to engage fixed stops 20 and 21 carried by the chassis extensions 10. In the present instance, the stop 21 is an integral shoulder on a block 22 secured to extension 10, which is usually channel-shaped. The blocks 22 fit snugly between the upper and lower flanges 10' of extensions 10 and are secured by screws, rivets or bolts 23, which also hold the outer stop plates 20 in place. The stops 20 and 21 hold the links 13 and 14 apart at a predetermined angle, which is preferably somewhere near ninety degrees.

In the normal position of the movable bumper parts, as shown in Fig. 2, the contracting coil springs 19 are under initial tension and hold the rear extensions of links 13 and 14 pressed against stops 20 and 21, so that no rattling is possible. When the bumper bars 16 and 17 strike an obstruction, they are forced apart and separate the links 13—14, whereby the coil springs 19 are expanded in a vertical direction. This will be clear by looking at Fig. 3. The strength of springs 19 is so chosen that they are capable of absorbing a powerful shock. Consequently, the head-on force of a collision is not transmitted to the car and its occupants (at least not to any great extent), but spends itself in expanding the springs 19 in a direction at right angles to the longitudinal axis of the car. As soon as the obstruction is removed from bumper bars 16—17, the tensioned springs 19 contract and return the links 13—14 to normal position.

The initial tension of springs 19 will probably vary in different designs of bumper and will be largely governed by the weight of the car. Obviously, heavier cars require stronger springs. If desired, the springs 19 may be connected to the links in such a way that their initial tension can be regulated, as by turning a nut. Instead of coil springs, I may use any other practical form of elastic member, such as bars of India rubber and the like.

It will be seen from the foregoing description that I have provided a simple bumper structure capable of absorbing the shocks of collisions by causing the force of the impact to spend itself in a vertical direction. The parts comprising the bumper structure are few and rugged, are easily attached to any style or make of car, and constitute an effective shock-absorbing bumper which is at the same time attractive in appearance.

Although I have shown and described a specific structure, I want it understood that my invention is not limited to the details set forth. Changes and modifications will probably occur to others without departing from the scope of the invention as defined in the appended claims. When I speak of my device as a bumper for automobiles, I do not necessarily mean passenger cars, but any kind of automotive vehicle to which a bumper may be attached, such as trucks, buses and the like.

I claim as my invention:

1. An automobile bumper structure comprising two bumper bars arranged in vertically spaced relation and mounted so as to be forced apart under the action of an impact, and spring means tensioned in a substantially vertical direction when the bumper bars strike an obstruction.

2. An automobile bumper structure comprising two bumper bars arranged in vertically spaced relation, pivotal members mounted on the vehicle and carrying said bumper bars, which are forced apart under the action of an impact, and spring means tensioned in a substantially vertical direction when the bumper bars are spread apart.

3. An automobile bumper structure comprising two bumper bars arranged in vertically spaced relation, pivotal members mounted on the vehicle and carrying said bumper bars, which are forced apart under the action of an impact, and a pair of vertical coil springs arranged to be expanded when the bumper bars are spread apart.

4. An automobile bumper structure comprising two pairs of links pivoted to the car, one link of each pair extending upward and the other link downward, an elastic member connecting each pair of links, means for normally holding the links of each pair at a predetermined angle, a bumper bar carried by the two upper links, and a second bumper bar carried by the two lower links, whereby said bumper bars are forced apart when they strike an obstruction and tension said elastic members.

5. An automobile bumper structure comprising two pairs of links pivoted to the car, one link of each pair extending upward and the other link downward, a contracting coil spring connecting each pair of links near their outer ends, means for normally holding the links of each pair at a predetermined angle, a bumper bar carried by the two upper links, and a second bumper bar carried by the two lower links, whereby said bumper bars are forced apart when they strike an obstruction and expand said coil springs in a substantially vertical direction.

6. An automobile bumper structure comprising two bumper bars arranged in vertically spaced relation and mounted so as to be forced apart under the action of an impact, and elastic means adapted to be tensioned when the bumper bars are forced apart.

ADOLPH A. THOMAS.